US012572443B2

(12) United States Patent
Kataya et al.

(10) Patent No.: US 12,572,443 B2
(45) Date of Patent: Mar. 10, 2026

(54) DIAGNOSIS DEVICE FOR DETERMINING NOISE LEVEL

(71) Applicant: FANUC CORPORATION, Yamanashi (JP)

(72) Inventors: Hiroyuki Kataya, Yamanashi-ken (JP); Yasumichi Sakoda, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 67 days.

(21) Appl. No.: 18/262,592

(22) PCT Filed: Jan. 19, 2022

(86) PCT No.: PCT/JP2022/001703
§ 371 (c)(1),
(2) Date: Jul. 24, 2023

(87) PCT Pub. No.: WO2022/163451
PCT Pub. Date: Aug. 4, 2022

(65) Prior Publication Data
US 2024/0078166 A1      Mar. 7, 2024

(30) Foreign Application Priority Data
Feb. 1, 2021    (JP) ................................. 2021-014061

(51) Int. Cl.
*G06F 11/34*        (2006.01)
*G06F 3/041*        (2006.01)
*G06F 3/044*        (2006.01)
(52) U.S. Cl.
CPC ...... *G06F 11/3485* (2013.01); *G06F 3/04182* (2019.05); *G06F 3/044* (2013.01)

(58) Field of Classification Search
None
See application file for complete search history.

(56) References Cited

U.S. PATENT DOCUMENTS 9,921,668 B1 *    3/2018    Chadda .............. G06F 3/04182
10,191,586 B2    1/2019    Kida et al.
(Continued)

FOREIGN PATENT DOCUMENTS

JP    2013114326 A    6/2013
JP    2016004337 A    1/2016
(Continued)

OTHER PUBLICATIONS

International Search Report issued by the Japan Patent Office acting as the International Searching Authority in relation to International Application No. PCT/JP2022/001703 dated Apr. 19, 2022 (3 pages) along with English language translation (2 pages).
(Continued)

*Primary Examiner* — Stephen T. Reed
(74) *Attorney, Agent, or Firm* — CARTER, DELUCA & FARRELL LLP

(57)                    ABSTRACT

A diagnosis device according to one embodiment of the present invention includes: a signal strength acquisition unit that acquires the signal strength of each of a plurality of nodes that divide a touch panel; and a noise level determination unit that determines a noise level on the basis of the state of the signal strengths under a touch detection threshold, among the acquired signal strengths.

10 Claims, 8 Drawing Sheets

(56) References Cited

U.S. PATENT DOCUMENTS

| | | | |
|---|---|---|---|
| 2015/0220170 A1* | 8/2015 | Nam ....................... | G06F 3/041 |
| | | | 345/173 |
| 2020/0125231 A1* | 4/2020 | Sakoda ............... | G06F 3/04166 |
| 2020/0125232 A1* | 4/2020 | Sakoda ............... | G06F 3/04186 |
| 2020/0192502 A1* | 6/2020 | Kataya .................... | G06F 3/044 |
| 2020/0192503 A1* | 6/2020 | Kataya ............... | G06F 3/04182 |
| 2020/0192526 A1* | 6/2020 | Kataya ................. | G06F 3/0446 |

FOREIGN PATENT DOCUMENTS

| | | |
|---|---|---|
| JP | 2017021518 A | 1/2017 |
| JP | 2019071020 A | 5/2019 |

OTHER PUBLICATIONS

Written Opinion of the International Searching Authority issued by the Japan Patent Office acting as the International Searching Authority in relation to International Application No. PCT/JP2022/001703 dated Apr. 19, 2022 (3 pages).

* cited by examiner

FIG. 1

F I G. 4
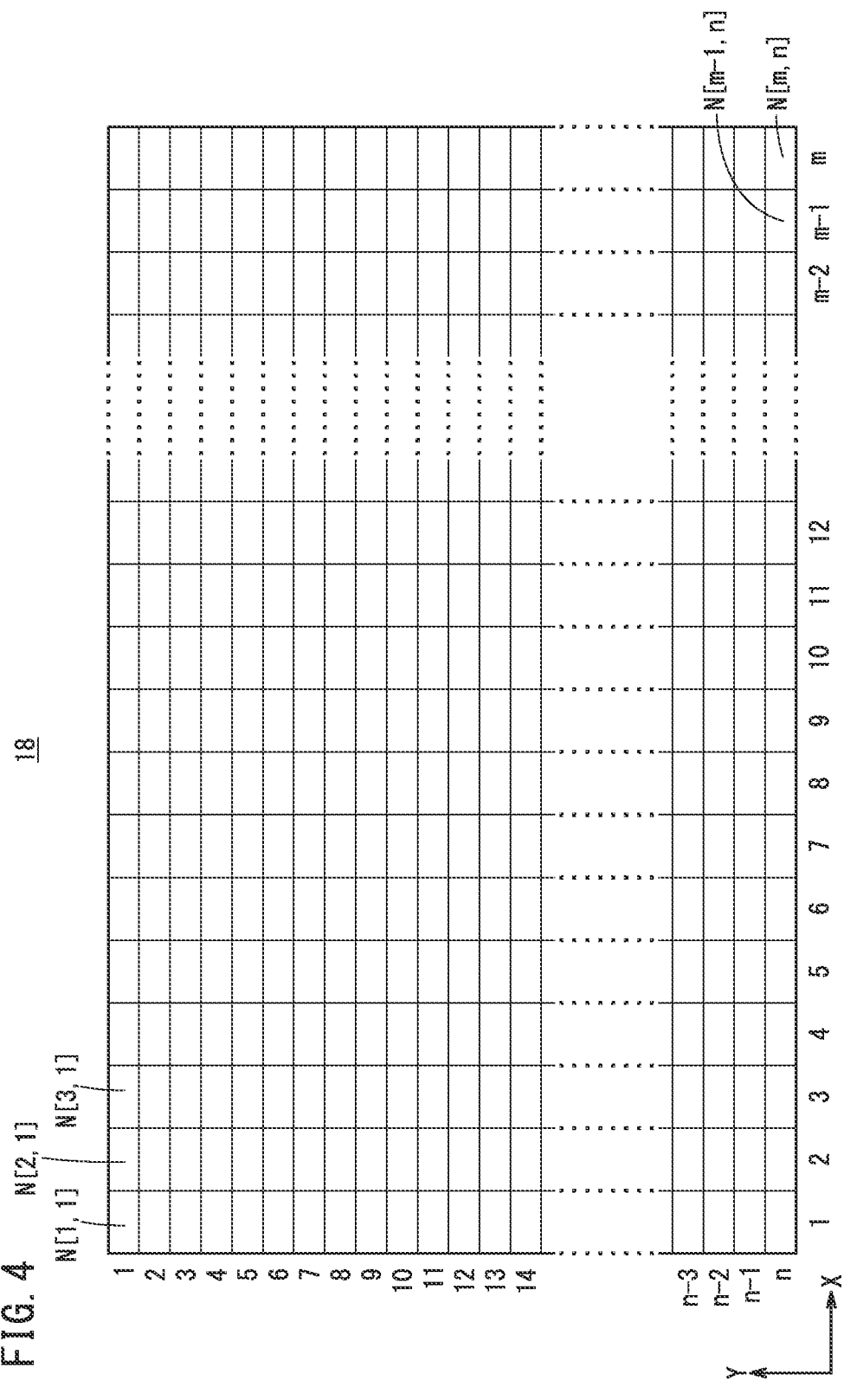

Figure 7:
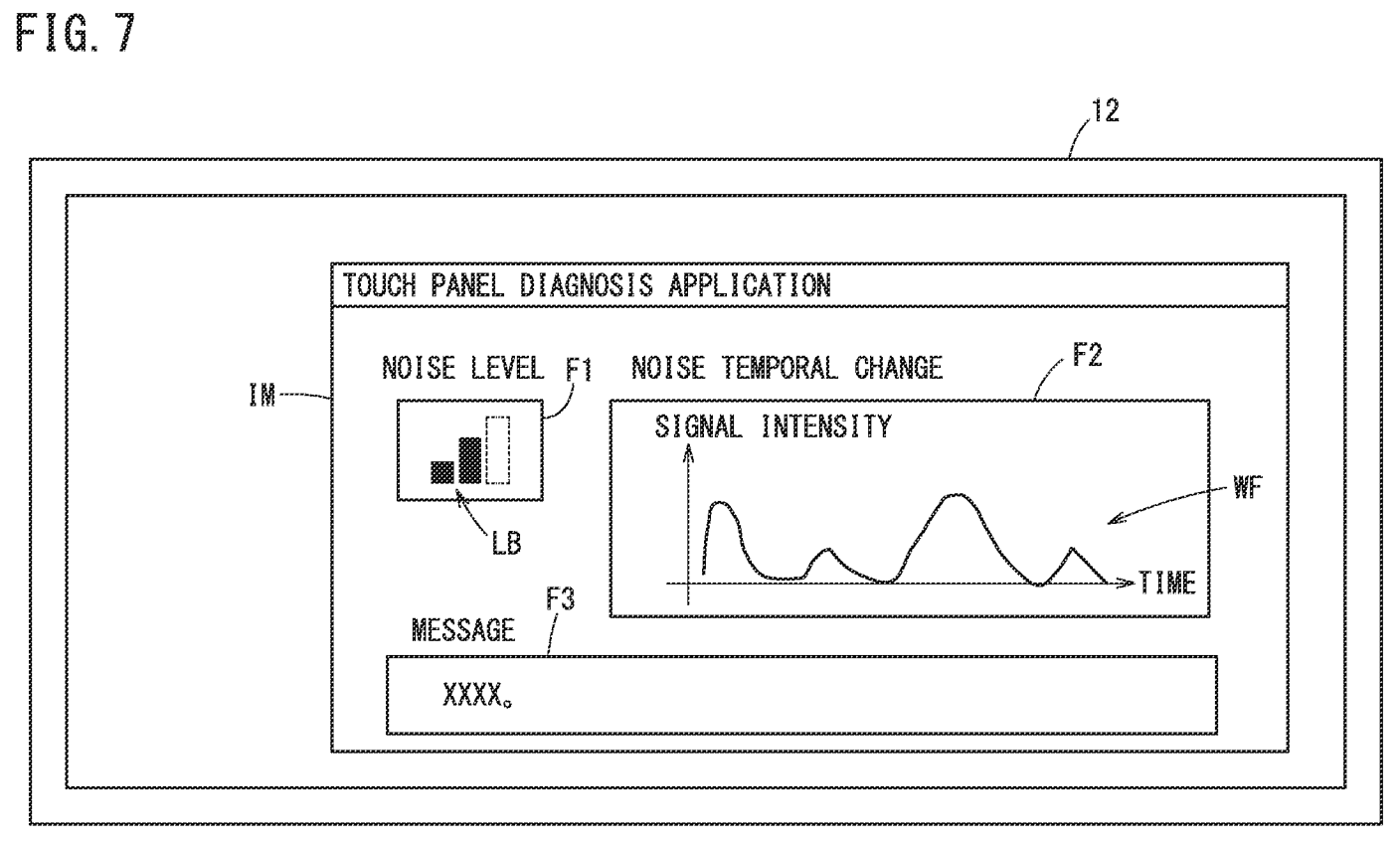

TOUCH PANEL DIAGNOSIS APPLICATION

NOISE LEVEL F1     NOISE TEMPORAL CHANGE

LB

SIGNAL INTENSITY

WF

TIME

F2

F3

MESSAGE

XXXX。

Figure 8:
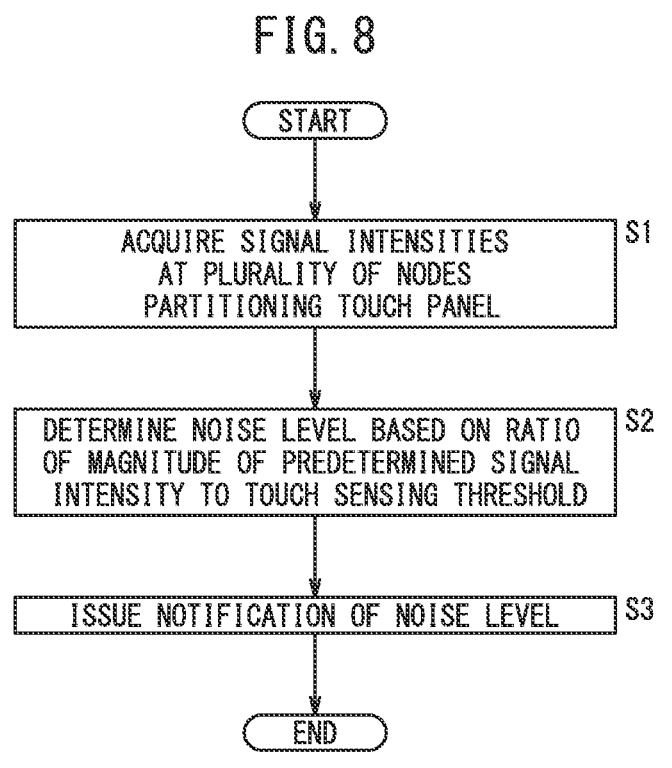

```
          ( START )
              │
              ▼
┌──────────────────────────────────┐  S1
│      ACQUIRE SIGNAL INTENSITIES   │
│        AT PLURALITY OF NODES      │
│      PARTITIONING TOUCH PANEL     │
└──────────────────────────────────┘
              │
              ▼
┌──────────────────────────────────┐  S2
│  DETERMINE NOISE LEVEL BASED ON RATIO │
│  OF MAGNITUDE OF PREDETERMINED SIGNAL │
│   INTENSITY TO TOUCH SENSING THRESHOLD│
└──────────────────────────────────┘
              │
              ▼
┌──────────────────────────────────┐  S3
│   ISSUE NOTIFICATION OF NOISE LEVEL │
└──────────────────────────────────┘
              │
              ▼
           ( END )
```

DIAGNOSIS DEVICE FOR DETERMINING NOISE LEVEL

CROSS-REFERENCE TO RELATED APPLICATIONS

This application is a national phase entry under 35 U.S.C. 371 of PCT International Application No. PCT/JP2022/001703, filed Jan. 19, 2022, which claims priority to Japanese Patent Application No. 2021-014061, filed Feb. 1, 2021, the disclosure of each of these applications is expressly incorporated herein by reference in their entirety.

TECHNICAL FIELD

The present invention relates to a diagnosis device and a diagnosis method (a diagnosis device for determining a noise level) for diagnosing a state of noise applied to an electrostatic capacitive touch panel.

BACKGROUND ART

A machine tool equipped with a touch panel has conventionally been disclosed, for example, in JP 2016-004337 A. In the case of an electrostatic capacitive touch panel, the electrostatic capacitance changes when noise is applied. Therefore, a touch operation may be erroneously detected depending on the operation environment and the sensitivity of the touch panel.

SUMMARY OF THE INVENTION

Incidentally, in a factory or the like where a plurality of machine tools operate, noise generated from a machine tool during machining is likely to be applied to machine tools installed around the machine tool during machining. However, the machine tools have not acquired the state of the noise.

Thus, the present invention has the object of providing a diagnosis device and a diagnosis method, which are capable of perceiving the state of noise.

A first aspect of the present invention is characterized by a diagnosis device that diagnoses a touch panel that is an electrostatic capacitive touch panel, the diagnosis device comprising: a signal intensity acquisition unit configured to acquire signal intensities at a plurality of nodes partitioning the touch panel; and a noise level determination unit configured to determine a noise level based on states of signal intensities less than a touch sensing threshold among acquired signal intensities which are the signal intensities that have been acquired.

A second aspect of the present invention is characterized by a diagnosis method for diagnosing a touch panel that is an electrostatic capacitive touch panel, the diagnosis method comprising: a signal intensity acquisition step of acquiring signal intensities at a plurality of nodes partitioning the touch panel; and a noise level determination step of determining a noise level based on states of signal intensities less than a touch sensing threshold among the signal intensities that have been acquired.

According to the aspects of the present invention, it is possible to perceive the state of noise. Specifically, it is difficult to determine whether the signal intensities greater than or equal to the touch sensing threshold are caused by a touch operation or noise, whereas the signal intensities less than the touch sensing threshold appear due to the influence of noise applied to the touch panel regardless of the presence or absence of a touch operation. Therefore, by determining the noise level based on the signal intensities less than the touch sensing threshold, it is possible to perceive the state of the noise.

BRIEF DESCRIPTION OF DRAWINGS

FIG. 1 is a block diagram illustrating the configuration of a touch panel device;

FIG. 4 is a diagram illustrating nodes on the touch panel;

FIG. 6 is a chart illustrating the distribution of signal intensities at respective nodes;

FIG. 7 is a diagram illustrating a display example of a noise level; and

FIG. 8 is a flowchart showing a procedure of a diagnostic process.

DETAILED DESCRIPTION OF THE INVENTION

Embodiment

Figure 1:
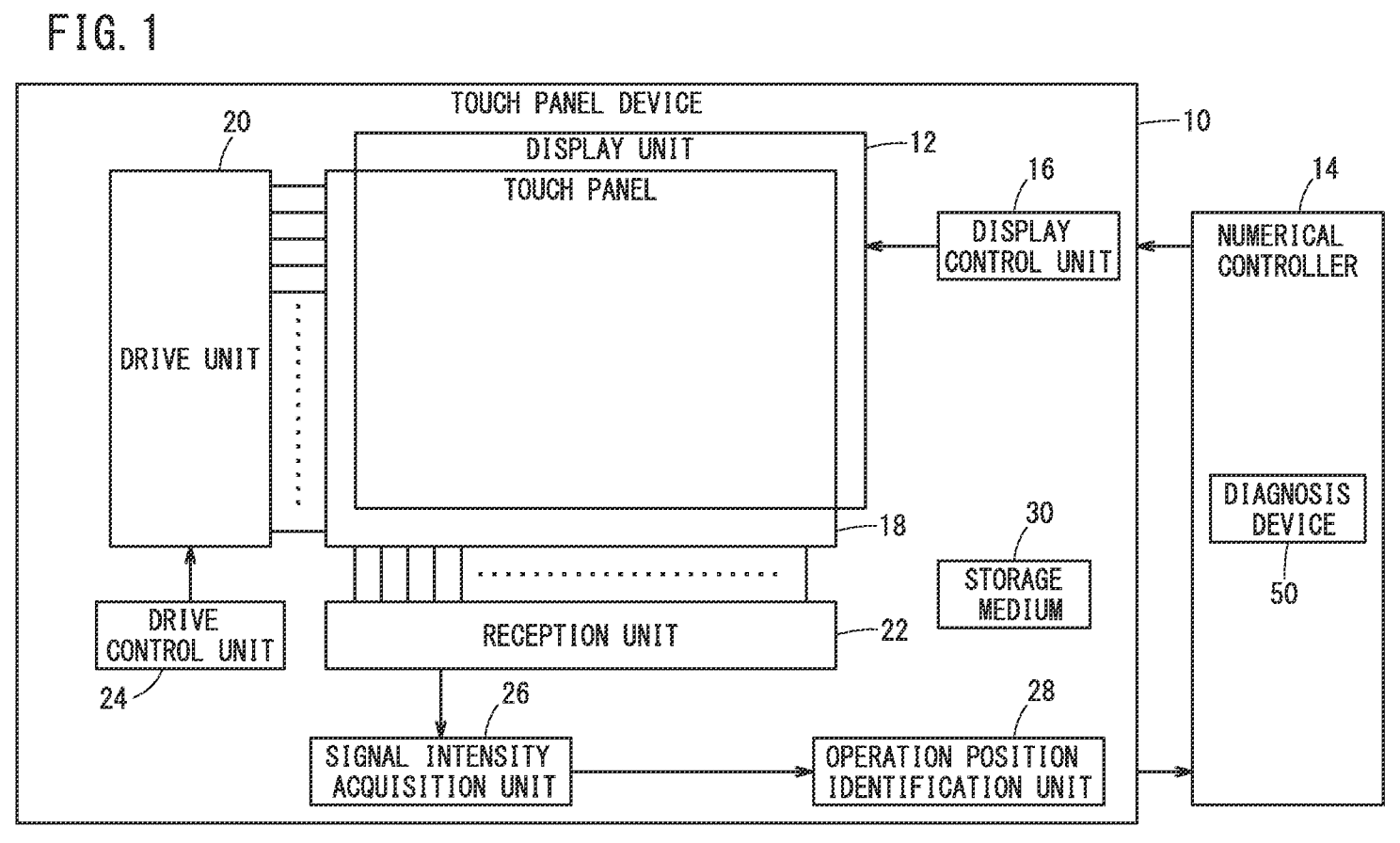
Figure 2:
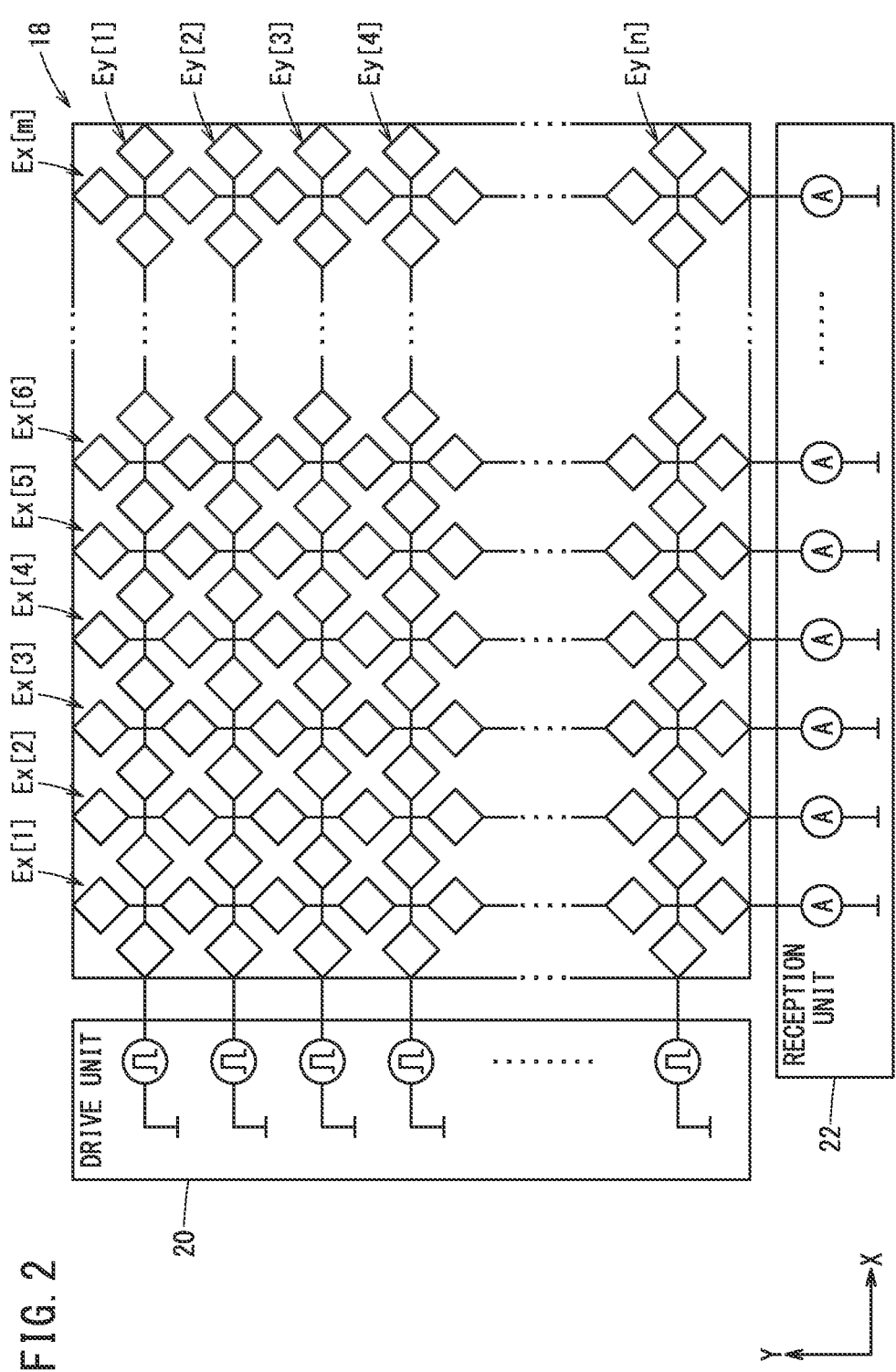
FIG. 2 is a schematic view illustrating the structure of a touch panel.

FIG. 1 is a block diagram illustrating the configuration of a touch panel device 10. An operator performs input to the touch panel device 10 by touching, with an operation body, a display unit 12 on which an image or the like is displayed. The operation body is, for example, a user's finger, a stylus, or the like. A numerical controller 14 for controlling a machine tool is connected to the touch panel device 10. The touch panel device 10 is used as an input device of the numerical controller 14.

The touch panel device 10 includes the display unit 12, a display control unit 16, a touch panel 18, a drive unit 20, a reception unit 22, a drive control unit 24, a signal intensity acquisition unit 26, an operation position identification unit 28, and a storage medium 30.

The display unit 12 is a liquid crystal display or the like. The display unit 12 displays icons for inputting commands to the numerical controller 14, information indicating the state of the machine tool transmitted from the numerical controller 14, or the like. The display control unit 16 controls the display unit 12 in accordance with a request from the numerical controller 14.

The touch panel 18 is an electrostatic capacitive touch panel. The touch panel 18 may be a mutual capacitive touch panel or a self-capacitive touch panel, among electrostatic capacitive touch panels. In the present embodiment, the touch panel 18 is a mutual capacitive touch panel among the electrostatic capacitive touch panels. The touch panel 18 is formed in a transparent film shape, and is disposed on a screen of the display unit 12. The drive unit 20 and the reception unit 22 are connected to the touch panel 18.

FIG. 2 is a schematic view illustrating the structure of the touch panel 18. The touch panel 18 includes X-axis electrodes Ex[1] to Ex[m], and Y-axis electrodes Ey[1] to Ey[n]. The X-axis electrodes Ex[1] to Ex[m] are provided in m lines in the X-axis direction and each extend in the Y-axis direction. The Y-axis electrodes Ey[1] to Ey[n] are provided in n lines in the Y-axis direction and each extend in the X-axis direction.

The drive unit 20 is connected to the Y-axis electrodes Ey[1] to Ey[n]. The drive unit 20 transmits a drive pulse signal to each of the Y-axis electrodes Ey[1] to Ey[n]. Hereinafter, when the Y-axis electrodes Ey[1] to Ey[n] are not distinguished from each other, they may be referred to as Y-axis electrodes Ey.

The reception unit 22 is connected to the X-axis electrodes Ex[1] to Ex[m]. The reception unit 22 receives a current signal from each of the X-axis electrodes Ex[1] to Ex[m]. Hereinafter, when the X-axis electrodes Ex[1] to Ex[m] are not distinguished from each other, they may be referred to as X-axis electrodes Ex.

Figure 3:
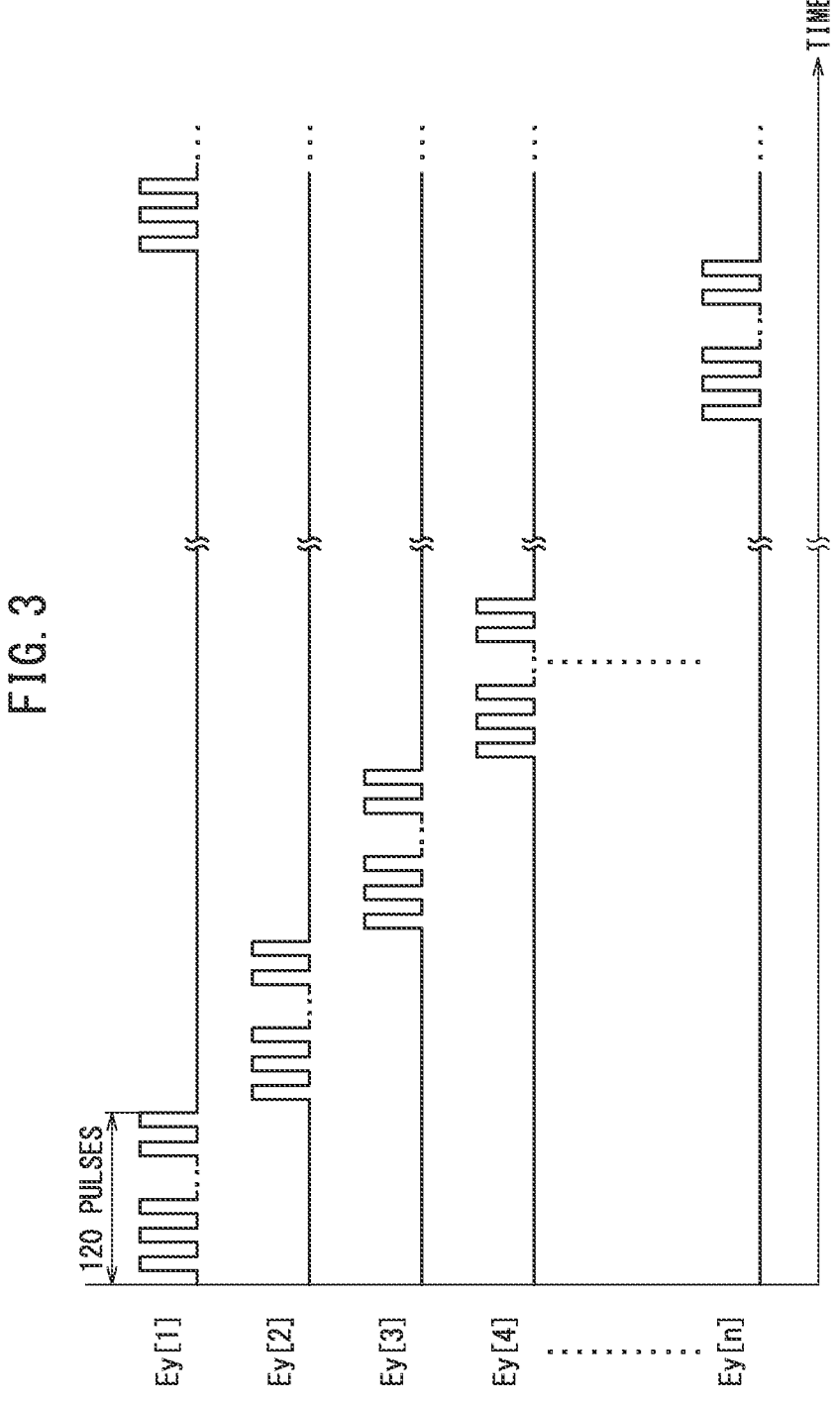
FIG. 3 is a graph illustrating drive pulse signals input from a drive unit to Y-axis electrodes.

The drive control unit 24 (FIG. 1) controls the drive unit 20 to sequentially transmit drive pulse signals having a set frequency in order from the Y-axis electrode Ey[1] to the Y-axis electrode Ey[n]. FIG. 3 is a graph illustrating drive pulse signals input from the drive unit 20 to the Y-axis electrodes Ey. The drive control unit 24 controls the drive unit 20 to sequentially transmit drive pulse signals of 120 pulses having a set frequency to the respective Y-axis electrodes Ey. The drive unit 20 periodically transmits drive pulse signals to the Y-axis electrodes Ey[1] to Ey[n], and more specifically transmits the drive pulse signal of 120 pulses at a time. The number of pulses of the drive pulse signal is not limited to 120 pulses.

The signal intensity acquisition unit 26 acquires the signal intensity at each of nodes N[1, 1] to N[m, n] on the touch panel 18, from the current signal received from each of the X-axis electrodes Ex by the reception unit 22. Hereinafter, when the nodes N[1, 1] to N[m, n] are not distinguished from each other, they may be referred to as nodes N.

In a state where the touch panel 18 is not being operated, the operation body is not in contact with the touch panel 18. In this case, current flows between the Y-axis electrodes Ey and the X-axis electrodes Ex in accordance with the drive pulse signals. At this time, the amplitude of a voltage signal obtained by converting the current signal of the X-axis electrode Ex received by the reception unit 22 is voltage V0. In a state in which the touch panel 18 is being operated, the operation body is in contact with the touch panel 18. In this case, current flows also between the Y-axis electrodes Ey and the operation body in accordance with the drive pulse signals. Therefore, the current flowing to the X-axis electrodes Ex in a state where the touch panel 18 is being operated is smaller than in a state where the touch panel 18 is not being operated. At this time, the amplitude of the voltage signal obtained by converting the current signal of the X-axis electrode Ex received by the reception unit 22 becomes smaller than the voltage V0. The signal intensity acquisition unit 26 acquires the detection signals of the respective X-axis electrodes Ex using the voltage V0 as a reference voltage. Specifically, the detection signal is a signal corresponding to a difference ($|V0-V|$) between the voltage (reference voltage) V0 and a voltage V obtained by converting the current of each Y-axis electrode Ey received by the reception unit 22.

FIG. 4 is a diagram illustrating nodes N[1, 1] to N[m, n] on the touch panel 18. Each node N corresponds to one of sections obtained by dividing the touch panel 18 into a matrix of sections. Each node N is associated with a set of the Y-axis electrode Ey and the X-axis electrode Ex. Although lines indicating the boundaries of the nodes N are shown in FIG. 4, the lines indicating the boundaries of the nodes N are not actually visible on the touch panel 18.

The signal intensity acquisition unit 26 specifies one node N corresponding to a combination of a line of the Y-axis electrode Ey to which the drive unit 20 has transmitted the drive pulse signal and a line of the X-axis electrode Ex from which the reception unit 22 has received the current signal. The signal intensity acquisition unit 26 acquires the intensity of the detection signal of the X-axis electrode Ex constituting the specified node N, as a signal intensity at the specified node N. For example, in the case where the drive unit 20 transmits the drive pulse signal to the Y-axis electrode Ey[3] and the reception unit 22 receives the current signal of the X-axis electrode Ex[4], the signal intensity acquisition unit 26 specifies the node N[4, 3]. In this case, the signal intensity acquisition unit 26 acquires the intensity of the detection signal of the X-axis electrode Ex[4] constituting the node N[4, 3], as the signal intensity at the node N[4, 3].

The operation position identification unit 28 identifies an operation position based on the signal intensity at each node N acquired by the signal intensity acquisition unit 26. A method by which the operation position identification unit 28 identifies the operation position can be arbitrarily selected from known methods. Accordingly, a detailed explanation of such a method will be omitted herein.

The display control unit 16, the drive control unit 24, the signal intensity acquisition unit 26, and the operation position identification unit 28 may be realized by causing a processor included in the touch panel device 10 to execute a program stored in the storage medium 30.

Figure 5:
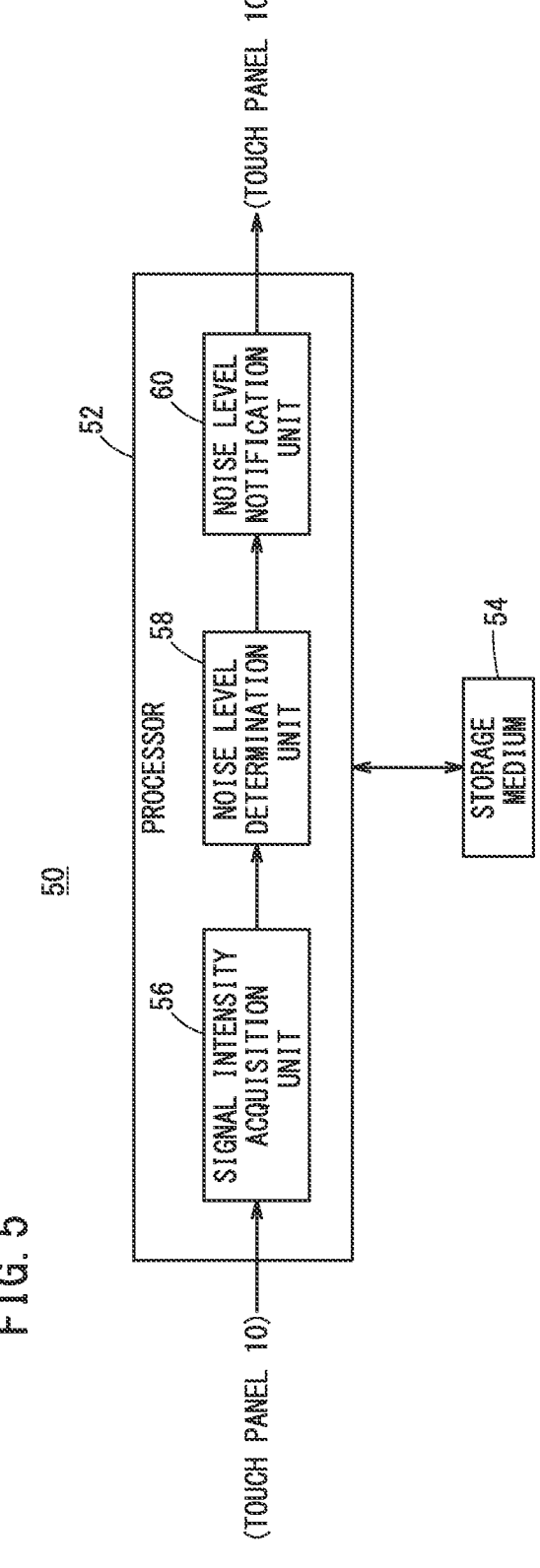
FIG. 5 is a block diagram illustrating the configuration of a diagnosis device.

In the present embodiment, a diagnosis device 50 for diagnosing the touch panel 18 is provided in the numerical controller 14. FIG. 5 is a block diagram illustrating the configuration of the diagnosis device 50. The diagnosis device 50 includes a processor 52 such as a CPU and an MPU, and a storage medium 54 including various memories such as a ROM, a RAM, and a hard disk. The diagnosis device 50 causes the processor 52 to execute a diagnostic program that is stored in the storage medium 54. When the diagnostic program is executed, the processor 52 operates as a signal intensity acquisition unit 56, a noise level determination unit 58, and a noise level notification unit 60. Moreover, at least one of the signal intensity acquisition unit 56, the noise level determination unit 58, or the noise level notification unit 60 may be implemented by an integrated circuit such as an ASIC and an FPGA. Further, at least one of the signal intensity acquisition unit 56, the noise level determination unit 58, or the noise level notification unit 60 may be constituted by an electronic circuit including a discrete device.

The signal intensity acquisition unit 56 acquires the signal intensities at the plurality of nodes N. The signal intensity acquisition unit 56 may receive, from the signal intensity acquisition unit 26 of the touch panel device 10, the signal intensity at each node N acquired by the signal intensity acquisition unit 26. In addition, in the same manner as the signal intensity acquisition unit 26 does, the signal intensity acquisition unit 56 may acquire the signal intensity at each node N from the current signal received from each X-axis electrode Ex by the reception unit 22.

Figure 6:
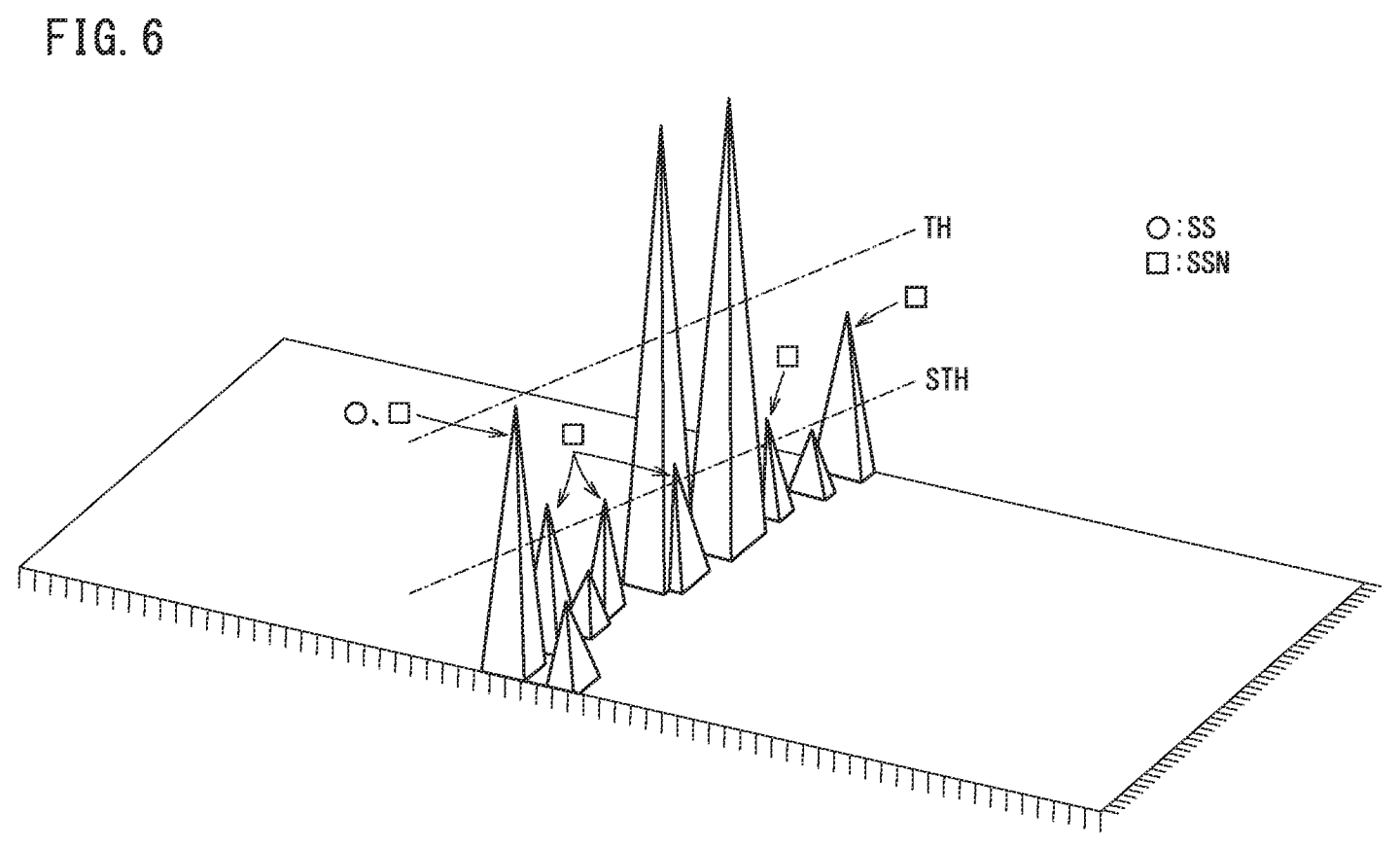

The noise level determination unit 58 determines a noise level based on the signal intensities at the respective nodes N acquired by the signal intensity acquisition unit 56. FIG. 6 is a chart illustrating the distribution of signal intensities at the respective nodes N. FIG. 6 illustrates a case where noise is generated during a touch operation.

It is difficult to determine whether the signal intensities greater than or equal to a touch sensing threshold TH are caused by a touch operation or noise. On the other hand, the signal intensities less than the touch sensing threshold TH appear due to the influence of noise applied to the touch panel 18 regardless of the presence or absence of a touch operation. In particular, a signal intensity SS that is less than the touch sensing threshold TH and is closest to the touch sensing threshold TH can be one of parameters that are highly reliable as an indicator for estimating the degree of noise. The noise level determination unit 58 determines the noise level based on the magnitude of the signal intensity SS.

In the present embodiment, the noise level determination unit 58 obtains a ratio of the magnitude of the signal intensity SS to the touch sensing threshold TH. When the obtained ratio is less than 20%, the noise level determination unit 58 determines the noise level as stage 1 (low level). Further, when the obtained ratio is greater than or equal to 20% and less than 50%, the noise level determination unit 58 determines the noise level as stage 2 (middle level). Furthermore, when the obtained ratio is greater than or equal to 50% and less than 80%, the noise level determination unit 58 determines the noise level as stage 3 (high level). The number of stages of the noise level may be other than three, and the ranges of the ratio to be allocated to the stages may be other than the ranges described above.

In this manner, the noise level determination unit 58 determines the noise level based on the ratio of the magnitude of the signal intensity SS to the touch sensing threshold TH. Therefore, the noise level determination unit 58 can determine a noise level approximate to that of the noise actually applied to the touch panel 18. In addition, it is possible to acquire a more accurate noise level than a case where the noise level is determined based on the magnitude of the signal intensity SS itself.

The noise level notification unit 60 issues a notification of the noise level determined by the noise level determination unit 58. The noise level notification unit 60 issues a notification of the noise level by using at least one of a speaker, a light emitting unit, or the display unit 12. As a result, it is possible to make the operator who operates the touch panel 18 grasp the state of the noise, and it is possible to present, to the operator, an indicator for occurrence of erroneous detection of the touch operation due to noise.

Note that, in the case of using the speaker, the noise level notification unit 60 issues a notification of the noise level determined by the noise level determination unit 58, by controlling a speaker control unit connected to the speaker. For example, the noise level notification unit 60 may cause the speaker to emit a buzzer sound at a volume corresponding to the noise level, or may cause the speaker to emit sound of the noise level.

In the case of using the light emitting unit, the noise level notification unit 60 issues a notification of the noise level determined by the noise level determination unit 58, by controlling a light emission control unit connected to the light emitting unit. For example, the noise level notification unit 60 may cause the light emitting unit to emit light with brightness or color corresponding to the noise level, or may cause the light emitting unit to blink at the number of blinks per unit time corresponding to the noise level.

In the case of using the display unit 12, the noise level notification unit 60 issues a notification of the noise level determined by the noise level determination unit 58, by controlling the display control unit 16 connected to the display unit 12. FIG. 7 is a diagram illustrating a display example of the noise level. For example, the noise level notification unit 60 causes a diagnosis screen IM to be displayed on the display unit 12. In addition, the noise level notification unit 60 causes level bars LB having different heights depending on the noise level to be displayed in a noise level display field F1 on the diagnosis screen IM.

In the case of using the display unit 12, the noise level notification unit 60 may cause the signal intensities at the plurality of nodes N acquired by the signal intensity acquisition unit 56 to be displayed in chronological order. For example, the noise level notification unit 60 causes a graph to be displayed in a display field F2 for displaying a temporal change in noise, on the diagnosis screen IM. In the graph, for example, the vertical axis represents the signal intensity, and the horizontal axis represents time. In addition, every time the signal intensities at the plurality of nodes N are periodically acquired by the signal intensity acquisition unit 56, the noise level notification unit 60 calculates the average of the signal intensities at the plurality of nodes N, and causes a waveform WF obtained by plotting the calculated average on the graph in the display field F2 to be displayed in the display field F2. In this manner, the noise level notification unit 60 causes the average of the signal intensities at the plurality of nodes N acquired by the signal intensity acquisition unit 56 to be displayed in chronological order. This allows the operator who operates the touch panel 18 to grasp the tendency of a time slot or the like in which much noise is likely to occur.

Further, in the case of using the display unit 12, the noise level notification unit 60 may cause a message related to the noise level determined by the noise level determination unit 58 to be displayed. For example, the noise level notification unit 60 causes the determination result of the noise level determination unit 58 or attention-calling characters corresponding to the determination result of the noise level determination unit 58 to be displayed in a display field F3 on the diagnosis screen IM. As a result, it is possible to inform the operator who operates the touch panel 18 of a situation or the like in which noise occurs in an easily understandable manner.

Next, a description will be given concerning a diagnosis method of the diagnosis device 50. FIG. 8 is a flowchart showing a procedure of a diagnostic process.

In step S1, the signal intensity acquisition unit 56 acquires the signal intensities at the plurality of nodes N. When the signal intensities at the plurality of nodes N are acquired, the diagnostic process transitions to step S2.

In step S2, the noise level determination unit 58 detects the signal intensity SS that is less than the touch sensing threshold TH and is closest to the touch sensing threshold TH, among the signal intensities acquired in step S1. In addition, the noise level determination unit 58 obtains the ratio of the magnitude of the signal intensity SS to the touch sensing threshold TH, and determines the noise level based on the obtained ratio. When the noise level is determined, the diagnostic process transitions to step S3.

In step S3, the noise level notification unit 60 issues a notification of the noise level determined by the noise level determination unit 58. When a notification of the noise level is issued, the diagnostic process comes to an end.

In this manner, in the diagnosis device 50 and the diagnosis method according to the present embodiment, the noise level is determined based on the states of the signal intensities less than the touch sensing threshold TH, among the signal intensities at the plurality of nodes N partitioning the touch panel 18. The signal intensities less than the touch sensing threshold TH reflect noise applied to the touch panel 18 regardless of the presence or absence of a touch operation (see FIG. 6). Therefore, by determining the noise level based on the states of the signal intensities less than the touch sensing threshold TH, the state of the noise can be perceived.

Among the signal intensities less than the touch sensing threshold TH, the signal intensity SS closest to the touch sensing threshold TH can be one of parameters that are highly reliable as an indicator for estimating the degree of noise. In the diagnosis device 50 and the diagnosis method according to the present embodiment, the noise level is determined based on the ratio of the magnitude of the signal intensity SS to the touch sensing threshold TH. As a result, it is possible to determine a noise level approximate to that of the noise actually applied to the touch panel 18.

Further, in the diagnosis device 50 and the diagnosis method according to the present embodiment, a notification of the determined noise level is issued. As a result, it is possible to make the operator who operates the touch panel 18 grasp the state of the noise. In addition, it is possible to present, to the operator, an indicator for occurrence of erroneous detection of the touch operation due to noise.

[Exemplary Modifications]

The above-described embodiment may be modified in the following manner.

(Exemplary Modification 1)

The noise level determination unit 58 may set at least one of a reference value of the ratio, the number of stages of the noise level, or the range of the ratio to be allocated to each of the stages, in response to an operation of the operator. In this case, it is possible to change the criteria for determining the noise level in accordance with the environment or the like in which the touch panel 18 is arranged. In the embodiment, the reference value of the ratio is the touch sensing threshold TH. Examples of an operation device operated by the operator include the touch panel 18, and an operator's panel provided in the machine tool.

(Exemplary Modification 2)

The noise level determination unit 58 may determine the noise level based on the magnitude of the signal intensity SS itself. In this manner as well, as in the embodiment, it is possible to determine a noise level approximate to that of the noise actually applied to the touch panel 18.

(Exemplary Modification 3)

The number of signal intensities SSN (see FIG. 6) that are less than the touch sensing threshold TH and greater than or equal to a threshold STH (see FIG. 6) that is smaller than the touch sensing threshold TH can be one of parameters that are highly reliable as an indicator for estimating noise. Therefore, the noise level determination unit 58 may determine the noise level based on the number of the signal intensities SSN.

The noise level determination unit 58 may determine the noise level based on the number of the signal intensities SSN itself. In this case, it is possible to determine a noise level approximate to that of the noise actually applied to the touch panel 18. Further, the noise level determination unit 58 may determine the noise level based on a ratio of the number of the signal intensities SSN to a reference value. In this case, the noise level can be determined without being affected by the size or the like of the touch panel 18. Therefore, the noise level of the noise actually applied to the touch panel 18 can be determined as compared to the case where the noise level is determined based on the number of the signal intensities SSN itself.

When determining the noise level based on the ratio of the number of the signal intensities SSN to the reference value, the noise level determination unit 58 may set the reference value in response to an operation of the operator. In this case, it is possible to change the criteria for determining the noise level in accordance with the environment or the like in which the touch panel 18 is arranged. Examples of an operation device operated by the operator include the touch panel 18, and an operator's panel provided in the machine tool.

The noise level determination unit 58 may determine the noise level based on both the signal intensity SS and the number of the signal intensities SSN. For example, the noise level determination unit 58 can multiply the ratio of the magnitude of the signal intensity SS to the reference value by a coefficient corresponding to the number of the signal intensities SSN, and determine the noise level in three stages as in the embodiment based on the multiplication result.

(Exemplary Modification 4)

The noise level notification unit 60 may cause the intensity distribution (see FIG. 6) of the signal intensities at the plurality of nodes N acquired by the signal intensity acquisition unit 56 to be displayed in chronological order. In this case as well, it is possible to make the operator grasp the tendency of a time slot or the like in which much noise is likely to occur.

The noise level notification unit 60 may cause the average of the signal intensities at the plurality of nodes N to be displayed in chronological order, and may display the intensity distribution of the signal intensities at the plurality of nodes N to be displayed in chronological order.

(Exemplary Modification 5)

The noise level notification unit 60 need not necessarily be provided. Even if the noise level notification unit 60 is not provided, the state of noise can be perceived by the signal intensity acquisition unit 56 and the noise level determination unit 58.

(Exemplary Modification 6)

The diagnosis device 50 may be provided in a general-purpose personal computer connected to the touch panel device 10 or may be provided in the touch panel device 10.

(Exemplary Modification 7)

The above-described embodiment and Exemplary Modifications 1 to 6 may be arbitrarily combined within a range in which no technical inconsistencies occur.

[Inventions]

A first invention and a second invention will be described below as inventions that can be grasped from the above-described embodiment and Exemplary Modifications 1 to 7.

(First Invention)

The first invention is characterized by the diagnosis device (50) that diagnoses the electrostatic capacitive touch panel (18), the diagnosis device including: the signal intensity acquisition unit (56) that acquires signal intensities at the plurality of nodes (N) partitioning the touch panel; and the noise level determination unit (58) that determines the noise level based on the states of signal intensities less than the touch sensing threshold (TH) among the acquired signal intensities. It is difficult to determine whether the signal intensities greater than or equal to the touch sensing threshold are caused by a touch operation or noise, whereas the signal intensities less than the touch sensing threshold appear due to the influence of noise applied to the touch panel regardless of the presence or absence of a touch operation. Therefore, by determining the noise level based on the signal intensities less than the touch sensing threshold, it is possible to perceive the state of the noise.

The noise level determination unit may determine the noise level based on the magnitude of the signal intensity (SS) that is less than the touch sensing threshold and is closest to the touch sensing threshold. In accordance with this feature, it is possible to determine a noise level approximate to that of the noise actually applied to the touch panel.

The noise level determination unit may determine the noise level based on the ratio of the magnitude of the signal intensity to the reference value. In accordance with this feature, the noise level can be determined without being affected by the size or the like of the touch panel. Therefore, it is possible to determine a noise level approximate to that of the noise actually applied to the touch panel as compared to the case where the noise level is determined based on the magnitude of the signal intensity itself.

The noise level determination unit may set at least one of the reference value, the number of stages of the noise level, or the range of the signal intensity to be allocated to each of the stages of the noise level, in response to an operation of the operator. In accordance with this feature, it is possible to change the criteria for determining the noise level in accordance with the environment or the like in which the touch panel is arranged.

The reference value may be the touch sensing threshold. In accordance with this feature, it becomes easier to distinguish between a touch operation and noise.

The noise level determination unit may determine the noise level based on the number of signal intensities that are less than the touch sensing threshold and greater than or equal to the threshold (STH) that is smaller than the touch sensing threshold. In accordance with this feature, it is possible to determine a noise level approximate to that of the noise actually applied to the touch panel.

The diagnosis device may include the noise level notification unit (60) that issues a notification of the noise level. In accordance with this feature, it is possible to make the operator who operates the touch panel grasp the state of the noise, and it is possible to present, to the operator, an indicator for occurrence of erroneous detection of the touch operation due to noise.

The noise level notification unit may cause the noise level to be displayed, and together with the noise level, cause the acquired signal intensities at the plurality of nodes to be displayed in chronological order. In accordance with this feature, it is possible to make the operator who operates the touch panel grasp the tendency of a time slot or the like in which much noise is likely to occur.

The noise level notification unit may cause the noise level to be displayed on the screen of the display unit (12) on which the touch panel is disposed. In accordance with this feature, it is possible to make the operator who operates the touch panel grasp the noise level while performing the touch operation.

(Second Invention)

The second invention is characterized by the diagnosis method for diagnosing the electrostatic capacitive touch panel. The diagnosis method includes the signal intensity acquisition step (S1) of acquiring signal intensities at the plurality of nodes partitioning the touch panel, and the noise level determination step (S2) of determining the noise level based on the states of signal intensities less than the touch sensing threshold among the acquired signal intensities. It is difficult to determine whether the signal intensities greater than or equal to the touch sensing threshold are caused by a touch operation or noise, whereas the signal intensities less than the touch sensing threshold appear due to the influence of noise applied to the touch panel regardless of the presence or absence of a touch operation. Therefore, by determining the noise level based on the signal intensities less than the touch sensing threshold, it is possible to perceive the state of the noise.

The invention claimed is:

1. A diagnosis device that diagnoses a touch panel that is an electrostatic capacitive touch panel, the diagnosis device comprising:

a signal intensity acquisition unit configured to acquire signal intensities indicating strength of voltage of an electrical signal output from each of a plurality of nodes partitioning the touch panel, based on the electrical signal; and a noise level determination unit configured to determine a noise level of the touch panel based on signal intensities less than a touch sensing threshold among acquired signal intensities which are the signal intensities that have been acquired, wherein the touch sensing threshold is a threshold for determining whether a touch operation is performed on the touch panel, wherein the touch sensing threshold is used as a reference value for obtaining a ratio of the signal intensity to the touch sensing threshold.

2. The diagnosis device according to claim 1, wherein the noise level determination unit determines the noise level based on a magnitude of a signal intensity that is less than the touch sensing threshold and is closest to the touch sensing threshold, among the acquired signal intensities.

3. The diagnosis device according to claim 2, wherein the noise level determination unit determines the noise level based on a ratio of a magnitude of the signal intensity to a reference value.

4. The diagnosis device according to claim 3, wherein the noise level determination unit sets at least one of the reference value, a number of stages of the noise level, or a range of the signal intensity to be allocated to each of the stages of the noise level, in response to an operation of an operator.

5. The diagnosis device according to claim 3, wherein the reference value is the touch sensing threshold.

6. The diagnosis device according to claim 1, wherein the noise level determination unit determines the noise level based on a number of signal intensities that are less than the touch sensing threshold and greater than or equal to a threshold that is smaller than the touch sensing threshold, among the acquired signal intensities.

7. A diagnosis device that diagnoses a touch panel that is an electrostatic capacitive touch panel, the diagnosis device comprising:

a signal intensity acquisition unit configured to acquire signal intensities indicating strength of voltage of an electrical signal output from each of a plurality of nodes partitioning the touch panel, based on the electrical signal;

a noise level determination unit configured to determine a noise level of the touch panel based on signal intensities less than a touch sensing threshold among acquired signal intensities which are the signal intensities that have been acquired, wherein the touch sensing threshold is a threshold for determining whether a touch operation is performed on the touch panel; and a noise level notification unit configured to issue a notification of the noise level.

8. The diagnosis device according to claim 7, wherein the noise level notification unit causes the noise level to be displayed, and together with the noise level, causes the acquired signal intensities at the plurality of nodes to be displayed in chronological order.

9. The diagnosis device according to claim 7, wherein the noise level notification unit causes the noise level to be displayed on a screen of a display unit on which the touch panel is disposed.

10. A diagnosis method for diagnosing a touch panel that is an electrostatic capacitive touch panel, the diagnosis method comprising:

a signal intensity acquisition step of acquiring signal intensities indicating strength of voltage of an electrical signal output from each of a plurality of nodes partitioning the touch panel, based on the electrical signal; and a noise level determination step of determining a noise level of the touch panel based on signal intensities less than a touch sensing threshold among the signal intensities that have been acquired, wherein the touch sensing threshold is a threshold for determining whether a touch operation is performed on the touch panel, wherein the touch sensing threshold is used as a reference value for obtaining a ratio of the signal intensity to the touch sensing threshold.

* * * * *